T. J. LINDSAY.
WHEEL.
APPLICATION FILED DEC. 22, 1913.
1,168,018.
Patented Jan. 11, 1916.
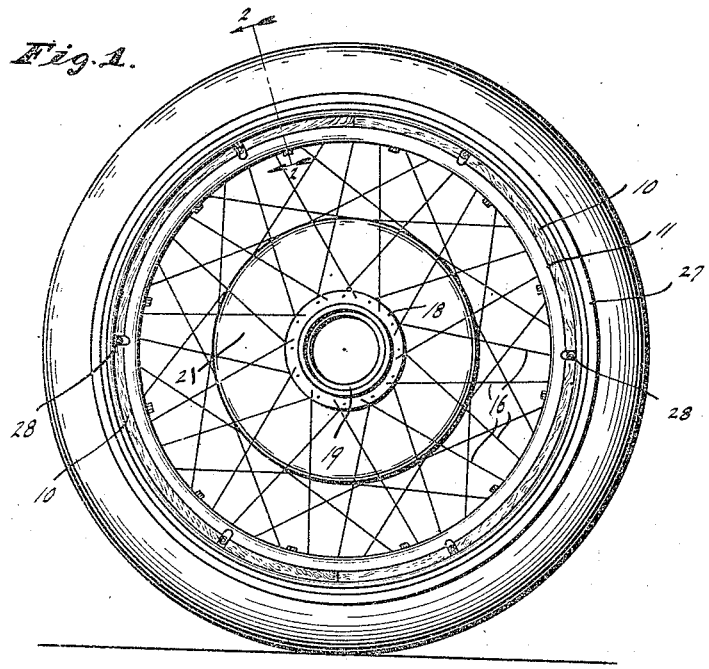
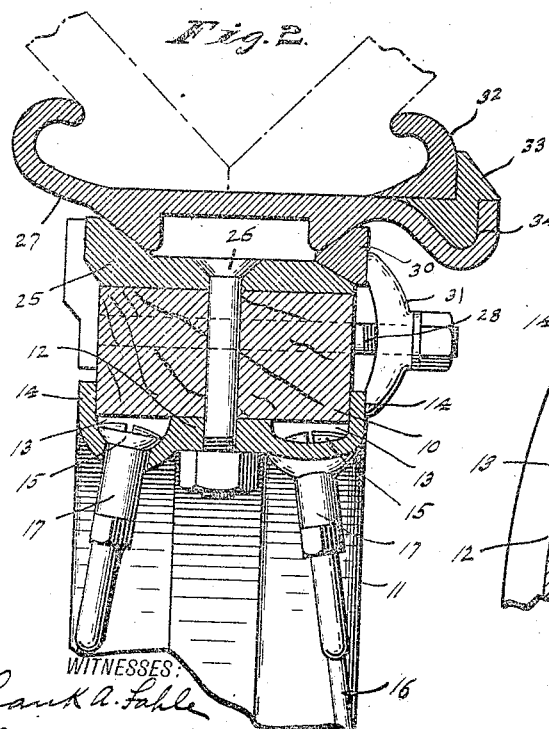
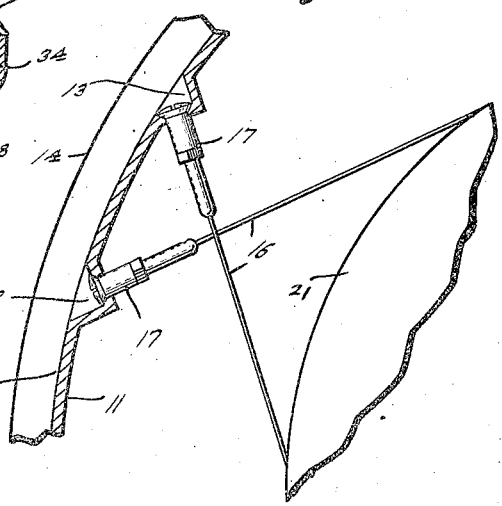
INVENTOR
Thomas J. Lindsay,
BY
Arthur M. Hood
ATTORNEY

UNITED STATES PATENT OFFICE.

THOMAS J. LINDSAY, OF INDIANAPOLIS, INDIANA, ASSIGNOR TO LINDSAY AUTO PARTS COMPANY, A CORPORATION OF INDIANA.

WHEEL.

1,168,018.     Specification of Letters Patent.     Patented Jan. 11, 1916.

Original application filed December 13, 1912, Serial No. 736,481. Divided and this application filed December 22, 1913. Serial No. 808,088.

*To all whom it may concern:*

Be it known that I, THOMAS J. LINDSAY, a citizen of the United States, residing at Indianapolis, in the county of Marion and State of Indiana, have invented a new and useful Wheel, of which the following is a specification.

It is the object of my invention to produce a wheel having wire spokes and a demountable rim for pneumatic tires.

This application in a division of my co-pending application Serial No. 736,481, filed December 13, 1912.

The accompanying drawing illustrates my invention.

In this drawing, Figure 1 is a side elevation of a rear vehicle wheel, provided with a brake drum, equipped with my invention; Fig. 2 is a section on the line 2—2 of Fig. 1; and Fig. 3 is a detail showing the mounting of the wire spokes in the inner metal felly.

A wood felly 10, made in two or more parts as indicated in Fig. 1, is mounted on an internal metal felly 11, which has a wide middle cylindrical shoulder portion 12 on which the wood felly 10 rests and a depressed channel portion 13 on each side of the shoulder portion 12, the channel portions terminating in flanges 14 which project slightly outward along and rest against the sides of the wood felly 10. The channel portions 13 are to receive the heads 15 of wire spokes 16, the bottoms of the channel portions 13 being bored and counter-sunk, conveniently by punching, under each head 15 to permit the passage of the shank 17 and the firm seating of the under side of the head, as indicated in Fig. 3. The spokes 16 extend inwardly at angles to the radii drawn through their outer ends, and their inner ends are attached to the inner rotating part. The spokes are in two sets, the inner ends of which are suitably attached to the desired parts. The spokes of the two sets diverge as they extend inward, the inner and outer ends of the spokes of the two sets respectively determining cones of which the elements are at equal angles to the plane of the tread of the wheel, in which plane said two cones intersect. The spokes of one set, or those leading to one of the channels 13, are conveniently attached to the flange 18 of the hub 19. Those of the other set are shown attached to the cylindrical portion of the brake drum 21, which the wheel is shown as having, in which case, for reasons pointed out in my aforesaid co-pending application, the associated spokes 16 preferably extend from the brake drum 21 to the channel 13 substantially tangent to the brake drum, or at any rate at a considerable angle to the radii drawn from the outer ends of said spokes, which angle is much larger than that between the spokes leading to the flange 18 and the radii drawn from the outer ends of these latter spokes, as indicated in Fig. 1, the countersinking punchings in each channel 13 being at the proper angle to make their bottom planes perpendicular to the spokes, as shown in Fig. 3. However, the mounting of the inner ends of the spokes forms no part of the invention in the present application, save as the countersinking for the outer ends of the spokes is made to correspond to the angle of the spokes.

Mounted on the outer periphery of the wood felly 10 is the felly band 25 of a standard demountable rim, such felly band 25 being fastened to the wood felly 10 and to the internal metal felly 11 by bolts 26 which extend through said three parts. The rim 27 surrounds the felly band 25, being detachably held in place by clamping bolts 28 extending through the wood felly 10 parallel to the wheel axis and having heads which bear against one side of the wood felly 10 and the felly band 25, a clamping ring 30, and bridge pieces 31 bearing against the clamping ring 30 and the flange 14, the bolts 28 extending through the wood felly 10 parallel to the axis of the wheel. The demountable rim 27 is provided with the usual removable side flange 32, held in place by locking segments 33 resting in a circumferential channel 34 at one edge of the rim 27.

I claim as my invention:

1. A wheel comprising a wood felly, an internal metal felly having a middle substantially cylindrical portion which furnishes a support for said wood felly and a channel portion on each side of said middle portion, said channel portions being of curved cross section and of smaller mean outside diameter than is said middle portion, and spokes mounted in said internal metal felly and extending inward therefrom.

2. A wheel comprising a wood felly, an internal metal felly having a middle substantially cylindrical portion which furnishes a support for said wood felly and a channel portion on each side of said middle portion, said channel portions being of smaller mean outside diameter than is said middle portion, and spokes mounted in said internal metal felly and extending inward therefrom.

3. A wheel comprising a wood felly, an internal metal felly having a middle substantially cylindrical portion which furnishes a support for said wood felly and a channel portion on each side of said middle portion, said channel portions being of curved cross section of smaller mean outside diameter than is said middle portion, and spokes mounted in said internal metal felly and extending inward therefrom.

4. A wheel comprising a wood felly, an internal metal felly having a middle substantially cylindrical portion which furnishes a support for said wood felly and channel portion on each side of said middle portion, and spokes mounted in said internal metal felly and extending inward therefrom.

In witness whereof, I, have hereunto set my hand at Indianapolis, Indiana, this 19th day of December, A. D. one thousand nine hundred and thirteen.

THOMAS J. LINDSAY.

Witnesses:
FRANK A. FAHLE,
MAY LAYDEW.

Copies of this patent may be obtained for five cents each, by addressing the "Commissioner of Patents, Washington, D. C."